Oct. 15, 1940.                H. D. J. CANTONI                2,217,669
                           RADIAL CYLINDER ENGINE
                             Filed Jan. 19, 1938
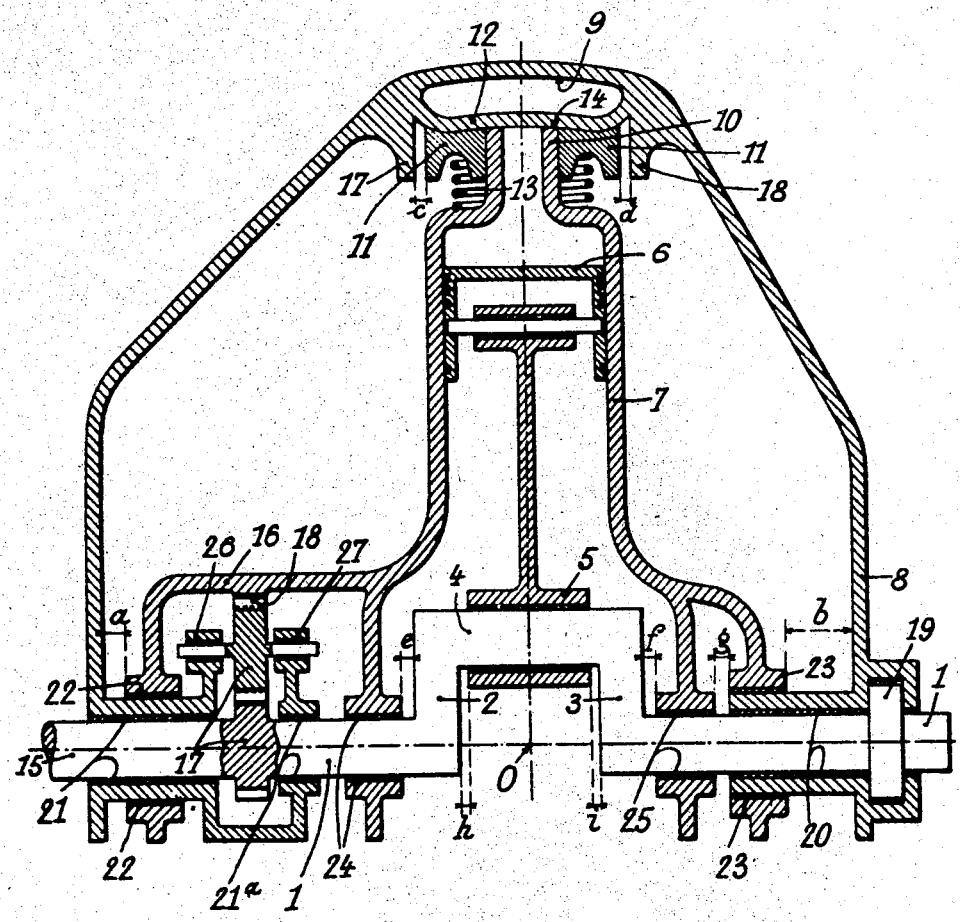

Patented Oct. 15, 1940

2,217,669

UNITED STATES PATENT OFFICE 2,217,669

RADIAL CYLINDER ENGINE

Humbert Denis Jean Cantoni, Paris, France, assignor to Mawen S. A., Paris, France, a stock company of France Application January 19, 1938, Serial No. 185,742
In France January 19, 1937

9 Claims. (Cl. 121—59)

My invention relates to radial-cylinder engines of the type controlled by an annular valve surrounding the cylinder heads and having a relative rotary movement with reference to the cylinders. According to one feature of my invention the bank or banks of radial-cylinders are mounted on the crank-shaft and also on the casing or other support of the said annular valve so as to be freely movable in the lengthwise direction, for instance through the medium of collars without stops, or of needle or roller bearings, or of smooth bearings free from any limitation of their displacement parallel with the axis of the crankshaft. The sealing and the positioning of the cylinders in the lengthwise direction are obtained for example by giving a spherical form to the inner face of the annular valve or valves and to the outer face of the cylinders in contact with said annular valve or valves.

According to a further feature of my said invention, the crank-shaft is located axially with respect to the casing of the engine at one place only along the axial length of the crankshaft.

It has been found by experiment that when an engine of the aforesaid type, which does not comprise the above-mentioned features, is in operation, the heat which is generated will cause the expansion of the various parts of the engine, and if these parts, which have relative movements with reference to one another, are in permanent contact, which is the case for the known engines, said expansion will produce, in the lengthwise direction, a friction which is sufficient to increase the heating of the engine to such a degree that the engine must be stopped. The improvements according to the invention have for their chief advantage of providing, when the different parts are subject to expansion or deformation, for displacements parallel with the axis of the crankshaft in one direction or the other, thus obviating the mutual friction of the said parts, and thus all heating is avoided.

The accompanying drawing, which is given merely by way of example, shows a partial section, on the axis of the crank-shaft, of a radial cylinder engine according to the invention.

In the embodiment herein represented, the engine comprises a crank-shaft 1 having two crank-arms 2 and 3, and a crank-pin 4 upon which act the big ends 5 of the piston rods of the pistons 6 which are in any suitable number. Each piston 6 operates in a cylinder 7 and the several cylinders 7 are arranged radially around the axis of the crank-shaft 1 and form an integral block. The said block has a relative movement of rotation with reference to the crank-shaft 1, and it is rotatable in the interior of a casing 8. The control of the admission and of the exhaust of the cylinders is effected by means of an annular valve 9 which is located at the periphery of the casing 8 and is provided with suitable admission and exhaust orifices not shown. The admission and exhaust for each cylinder 7 take place through a neck 10 carried by the end of the cylinder. A sealing member 11, provided with suitable packing rings not shown, surrounds the said neck, and it is applied against the surface of the wall 12 of the annular-valve by a spring 13 which bears against the upper face of the cylinder 7, thus affording a proper sealing. The end face 14 of the neck 10 and the face of the sealing member 11 which is in contact with the wall 12 of the annular-valve 9 on the one hand, and the surface of this wall 12 on the other hand, constitute centering surfaces and are formed for example by conjugated portions of two spheres the center of which is located at the point O, i. e. the intersection of the axis of the crankshaft and of the plane containing the axes of the cylinders.

This arrangement serves both to improve the sealing and to ensure a proper positioning of the bank of radial cylinders 7 in the interior of the casing 8 and in the lengthwise direction. The connection between the crank-shaft 1 and the bank of radial cylinders is ensured by a suitable set of gearing 17 which is located in the interior of a casing 16 secured to the cylinder 7, and in gear engagement with a toothed ring 18 carried by the casing 16. The bank of cylinders 7 and the casing 16 secured to the same, are mounted, with reference to the casing 8, without any limitation of axial displacement, this being effected for instance by means of smooth bearings or bearings of the roller or needle type 22 and 23, and by providing a sufficient axial clearance at $a$ and $b$.

In like manner, the relative movement of rotation of the movable set of cylinders with reference to the annular valve 12 is obtained without limitation of axial displacement, by providing a sufficient clearance at $c$ and $d$ between the sealing member 11 and the cheeks 17 and 18 of the fixed casing 8.

Finally the relative movement of rotation of the revolving cylinder bank with reference to the crank-shaft is obtained without limitation of the axial displacement, for instance by means of smooth bearings, or of roller or needle bearings 24 and 25, and by providing a sufficient axial clearance at $e$, $f$ and $g$.

Moreover the crank-shaft 1, which is rotatable with reference to the casing 8, is axially connected with this latter by a thrust ball-bearing 19, a smooth bearing 20, and by bearings 21 and 21ª without limitation of axial displacement, which may for instance be smooth bearings or roller or needle bearings.

In each cylinder, the end 5 of the piston rod is mounted on the crank-pin 4 without limitation of axial displacement, and this is obtained by providing a clearance h and i between the lateral faces of the end 5 of the piston rod and the crank arms 2 and 3.

The relative movement of rotation of the gearing 17 with reference to the set of cylinders is obtained without limitation of the axial displacement, for instance by means of smooth bearings, or of roller or needle bearings 26 and 27.

It will be thus observed that owing to these axial clearances and of the use of bearings without limitation of axial displacement, the bank of cylinders is loosely mounted in the axial direction with reference to the casing 8 and to the crank-shaft which is itself free to expand with reference to the casing 8, and in consequence, the different parts of the crankshaft, of the driven shaft, of the casing 8 and of the cylinder bank, may be subject to expansion or deformation without producing any gripping which would cause an excessive heat at the points where these different parts are in contact, in the various relative movements of rotation.

Obviously, the invention is not limited to the embodiment herein described and represented, which is given solely by way of example. In particular, an engine having a single annular valve has been represented, but the invention is obviously applicable to engines comprising several annular valves, each combined with a bank of radial cylinders, all the cylinders being mounted on the same crank-shaft and forming (or not) a single unit assemblage.

Having now described my invention what I claim as new and desire to secure by Letters Patent is:

1. In an engine, a first structure including a bank of radially arranged cylinders, a second structure including an annular valve member encircling the outer ends of said cylinders, and a third structure including a crank shaft, said structures being mounted for relative rotation between each two of the structures, pistons in said cylinders and means for connecting said pistons to said crankshaft, said first structure and said second structure having parts providing complementary surfaces in sliding contact with each other, said surfaces being shaped to tend to locate said first structure and said second structure axially with respect to each other, and the bearings between the several structures being constructed for freedom of relative axial movement between said first structure and said second structure, whereby to enable said surfaces to act as locating means for axially positioning the two last mentioned structures relative to each other.

2. In an engine, a first structure including a bank of radially arranged cylinders, a second structure including an annular valve member encircling the outer ends of said cylinders and a third structure including a crankshaft, said structures being mounted for relative rotation between each two of the structures, pistons in said cylinders and means for connecting said pistons to said crank shaft, bearing means between said second structure and said crankshaft for locating the crankshaft axially with respect to said second structure at one place only along the axial length of the crankshaft while permitting relative axial movement between the parts along the remainder of the length of the crankshaft, bearing means between said crankshaft on the one hand and said first structure and said pistons on the other hand, said bearing means being constructed for freedom of relative axial movement between the crankshaft, said first structure, and said pistons, said first structure and said second structure having parts providing cooperating surfaces in sliding contact located adjacent to the outer ends of the cylinders and shaped to locate said first structure axially with respect to said second structure.

3. In an engine, a casing carrying an annular valve member, a bank of radially arranged cylinders mounted to rotate inside said valve member and relative thereto, a crankshaft mounted to rotate relative to both said casing and said cylinder bank, means for locating the crankshaft axially with respect to said casing, said cylinder bank and said crankshaft having bearings providing for freedom of relative axial movement between the cylinder bank and the crankshaft, and means for locating said cylinder bank axially with respect to said casing by contact of parts carried respectively by said casing and by said cylinder bank adjacent the outer ends of the cylinders, said parts being in rotationally sliding relation.

4. In an engine, a crankshaft, a bank of radially arranged cylinders mounted for rotation about the axis of said crankshaft, a casing carrying an annular valve encircling the outer ends of said cylinders, said cylinder bank having relative rotational movement with respect to said valve and having bearings constructed to provide freedom of axial movement of the cylinder bank with respect to said valve and said crankshaft, and means associated with the outer ends of said cylinders in rotational sliding contact with co-operating surface on said annular valve for locating said cylinder bank axially relative to said valve.

5. In an engine, a crankshaft, a bank of radially arranged cylinders mounted for rotation about the axis of said crankshaft, a casing carrying an annular valve encircling the outer ends of said cylinders, said valve having a transversely curved inner sealing surface, said cylinder bank having relative rotational movement with respect to said valve and having bearings constructed to provide freedom of axial movement of the cylinder bank with respect to said valve and said crankshaft, and sealing means mounted at the outer ends of the cylinders for radial movement in the plane of said annular valve member, said sealing means having transversely curved sealing surface cooperating with the sealing surface on said valve and in rotationally sliding contact therewith and said sealing means acting to locate said cylinder bank axially with respect to said valve.

6. In an engine, a crankshaft, a bank of radially arranged cylinders mounted for rotation about the axis of said crankshaft, a casing carrying an annular valve encircling the outer ends of said cylinders, said valve having a transversely curved inner sealing surface, said cylinder bank having relative rotational movement with respect to said valve and having bearings constructed to provide freedom of axial movement of the cylinder bank with respect to said valve and said crankshaft, sealing means mounted at the outer ends of said cylinders for movement radially in the plane of said annular valve, said sealing means having a transversely curved sealing surface cooperating with the sealing surface on said valve and in sliding contact therewith, and spring means acting to force said sealing means outwardly in radial direction against the sealing surface of said valve member to thereby cause said transversely curved surfaces to locate said cylinder bank axially with respect to said valve.

7. In an engine, a crankshaft, a casing carrying an annular valve, bearings between said casing and said crankshaft including a thrust bearing for locating the crankshaft at one place axially with respect to the casing while permitting the remainder of the crankshaft to have axial movement relative to the casing, a bank of radially arranged cylinders mounted for rotation within said annular valve and around the axis of said crankshaft, the bearings for said cylinder bank being constructed for freedom of axial movement of the cylinder bank relative to said crankshaft and said casing, gearing connecting said crankshaft, said casing and said cylinder bank for timing the rotational movements of the connected parts relative to each other, said gearing being constructed to permit relative axial movement between the parts thereof carried respectively by the crankshaft, the casing, and the cylinder bank, and means associated with the outer ends of the cylinders and in rotationally sliding contact with said valve for locating the cylinder bank axially with respect to said casing.

8. In an engine, a crankshaft having a crank pin, casing structure including an annular valve, a bank of radially arranged cylinders located within said valve, pistons in said cylinders and connecting rod means for connecting said pistons with said crank pin, a bearing between said casing structure and said crankshaft at one side of said crank pin, said bearing including thrust bearing structure for locating the crank pin axially with respect to casing structure, a bearing between said casing structure and said crankshaft located at the opposite side of said crank pin and permitting relative axial movement between the casing structure and the crankshaft, bearings supporting said cylinder bank for rotation about the axis of the crankshaft, the last mentioned bearings being constructed for freedom of relative axial movement between the cylinder bank on one hand and the crankshaft and the casing structure on the other hand, bearing means between said crank pin and said connecting rods permitting relative axial movement between the crank pin and the connecting rods, and means comprising parts in rotationally sliding relation and associated respectively with the casing structure and the outer ends of the cylinders for locating the cylinder bank axially with respect to said casing structure and said valve.

9. In an engine, an annular valve having a concave spherically curved inner sealing surface, and a bank of radially arranged cylinders mounted for rotation within said valve, said cylinder bank including means located at the outer ends of the cylinders providing convex spherically curved surface in sliding contact with the inner surface of the valve, said cylinder bank having bearings constructed for freedom of movement of the cylinder bank axially with respect to said valve and said spherically curved surfaces constituting the sole means for locating the cylinder bank axially with respect to said valve.

HUMBERT DENIS JEAN CANTONI.